Patented Sept. 13, 1927.

1,642,320

UNITED STATES PATENT OFFICE.

ARNOLD K. BALLS, OF PHILADELPHIA, PENNSYLVANIA.

FOOD PRODUCT.

No Drawing.    Application filed November 9, 1925. Serial No. 68,019.

This invention relates to food products, and more particularly to a food product formed of yeast, and methods of making the same.

In the present invention, I provide a yeast food product in which the objectionable odor and flavor of the yeast is removed without removing the protein substances which contribute largely to the food value of the yeast.

Many processes have been suggested for preparing extracts from yeast. These extracts are generally similar to meat extractives containing very little protein, proteose, or peptone, and consist very largely of the ureides of the purin group. The food value of these preparations like that of meat extracts is very low. These methods of preparation all depend on hot water extraction and filtration, together with special features for removing the objectionable bitter and yeasty taste. Unless the flavor and odor of the yeast is removed, it is so strong that the product is useless for food.

In the present invention, I obtain a food product of a substance suitable for use as a base for incorporation with flavoring substances, without the necessity of resorting to the usual extracting and filtering. Due to the fact that there is no filtration, a higher yield of food substance is obtained from the yeast than has heretofore been possible.

In practicing the process, fresh yeast from any known source is separated from the accompanying liquid by any of the usual methods of pressing, settling or centrifugation. The yeast containing sufficient water to show a dry yeast substance content of from 5 to 15 per cent is then heated under pressure until the cells are disrupted and the mass entirely liquefied. The excess of moisture is then removed in an evaporator or on a water and steam bath until the desired consistency is reached. I prefer to evaporate until a water content of from 30 to 45 per cent is obtained.

By autoclaving the yeast in this manner, the flavor and odor of the yeast is entirely removed and a tasteless material containing practically all the food value of the original yeast is obtained to which salt, spices, or any desired flavoring substances may be added.

In practicing the process according to one example, 50 grams of compressed yeast is mixed with 350 cc. of water and the suspension placed in an autoclave and subjected to a temperature of 150° C., for a period of from 30 to 60 minutes. The resulting liquid is evaporated in such manner that it will not be scorched until it is reduced or concentrated to a volume of about 25 cc.

The temperature and pressure of the operation may be varied within certain limits if compensated for by an increase or decrease in the time of heating. However, the use of too high a pressure or too long a digestion results in coagulation which renders the final material non-miscible with water. If too low a pressure is employed or too short a digestion, destruction of the flavor and odor of the yeast is not attained. Thus, a treatment for one hour at a temperature of 115° C. was not sufficient to destroy the odor and flavor of the yeast. Moreover, by too high a pressure or too long a digestion coagulation occurs and this renders the final product nonmiscible with water. For example, this occurred in treating yeast at a temperature of 155° C. for ninety minutes.

The resulting product is a brown pasty mass giving an opalescent, milky liquid when mixed with water and, as stated, this substance may be employed as a base in the preparation of various food products.

I claim:

1. The herein described process of preparing food products from yeasts which comprises heating yeast to cause disruption of the yeast cells, controlling the temperature and time of treatment to prevent coagulation, and concentrating the resulting liquid.

2. The herein described process of preparing food products from yeast which comprises heating yeast to a temperature not over 150° C. for a period of less than 90 minutes, and concentrating the resulting liquid.

3. The herein described process of preparing food products from yeast which comprises forming a solution of from 5 to 15 per cent yeast content in water, heating to disrupt the yeast cells, controlling the temperature and time of treatment to prevent coagulation, and then concentrating the product until the water content is reduced to from 30 to 40 per cent.

In testimony whereof, I affix my signature.

ARNOLD K. BALLS.